United States Patent Office 3,338,275
Patented Aug. 29, 1967

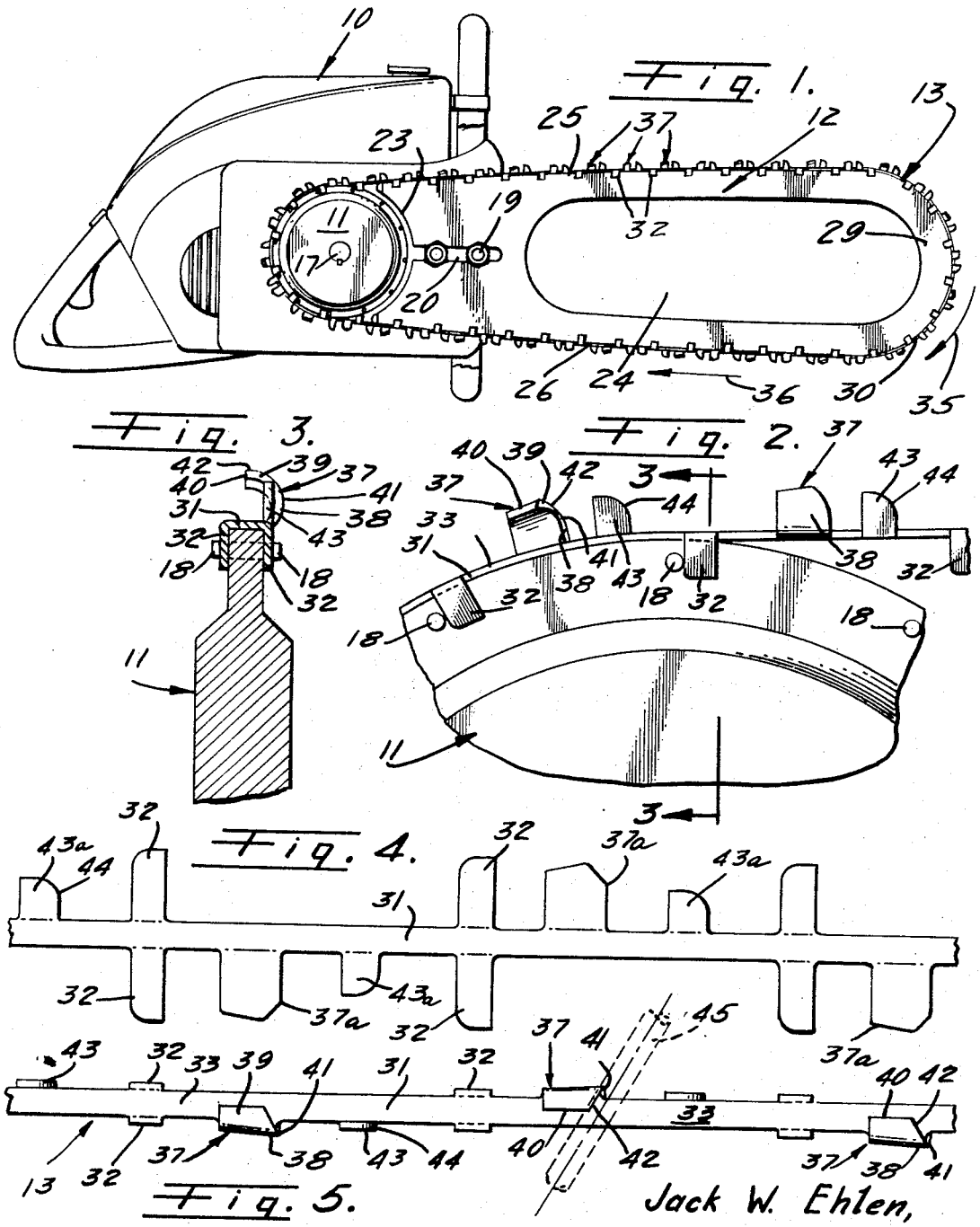

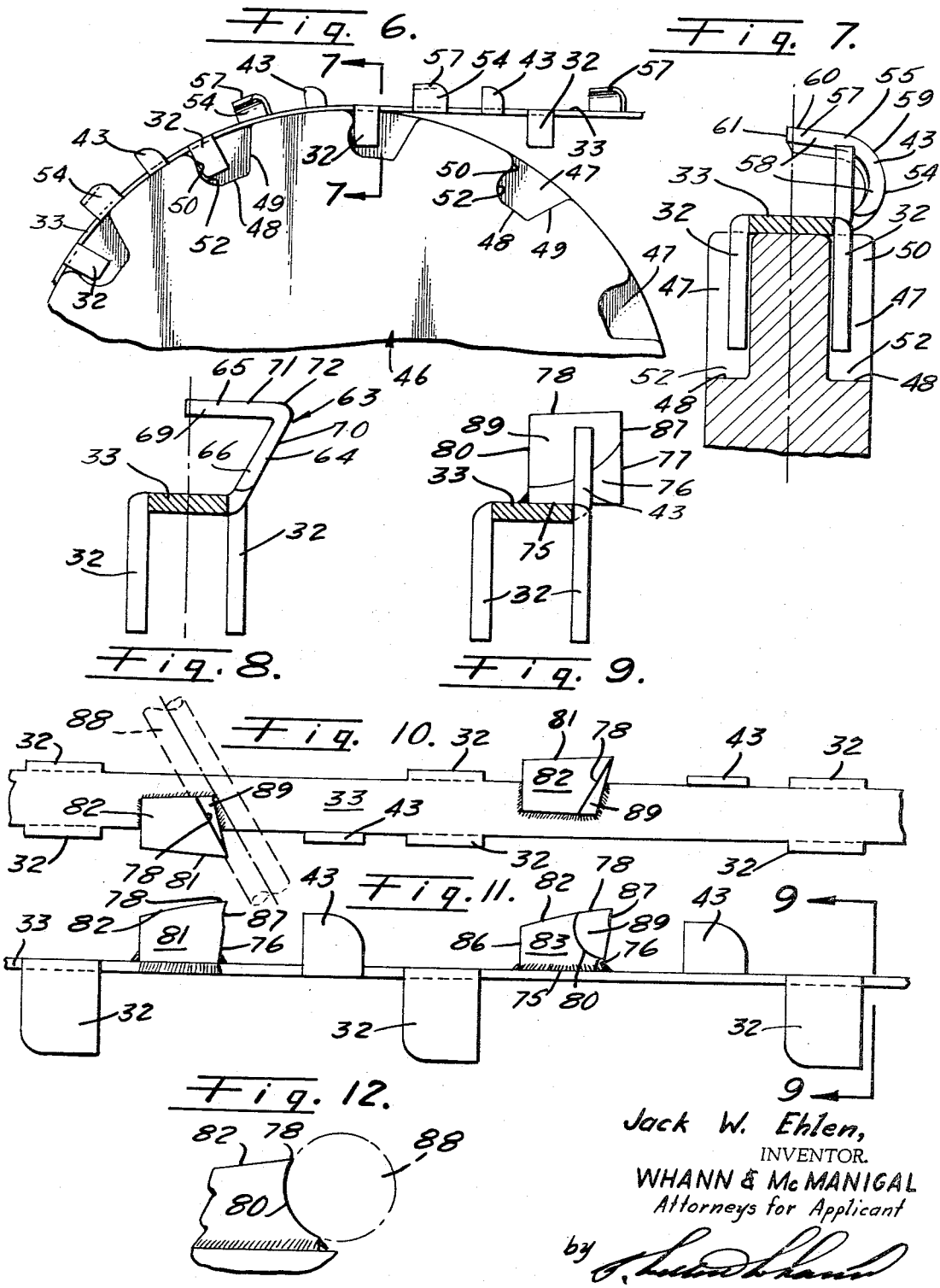

3,338,275
POWER DRIVEN CONTINUOUS CUTTING STRIP
Jack W. Ehlen, Torrance, Calif., assignor to McCulloch Corporation, Los Angeles, Calif., a corporation of Wisconsin
Filed Sept. 27, 1965, Ser. No. 490,386
17 Claims. (Cl. 143—32)

This invention relates to a continuous strip having cutting elements thereon and which may be driven by an engine, and, more particularly, to a cutting device which may be used as a successor to saw chains.

It is an object of the invention to provide an improved power driven cutting device.

It is another object of the invention to provide an improved wood-cutting device which is a successor to saw chains.

It is still another object of the invention to provide a cutting device, which, because of its low cost, may be economically thrown away when dull in contrast to saw chains which must be sharpened for economical reasons until they are worn beyond sharpening.

It is a further object of the present invention to provide a cutting device, as described in the preceding paragraphs, and which is of very light weight relative to a saw chain so as to reduce or substantially eliminate the inertia affects caused by weight. For example, the weight of a saw chain is very heavy compared with the size of its cutting element and this heavy weight causes the chain to hammer and pound, particularly, as it moves over a curved surface as on the nose of a chain saw bar.

It is a still further object of the invention to provide a cutting device, as described in the preceding paragraphs, and which would tend to not retain or carry foreign material during cutting. This is in contrast to saw chains in which the chain carries the foreign material. It is this which causes a substantial stretching of the chain so as to loosen it on the chain saw. The present invention carries little or no foreign material and, therefore, it does not stretch a significant amount.

It is another object of the invention to provide a continuous cutting strip having cutting elements and which because of its uninterrupted surface provides for a smooth flow of the chips cut. This is in contrast to a saw chain which has one interrupted surface following another and which prevents a smooth flow of chips during the cutting operation.

It is still another object of the present invention to provide a device, as described in the previous paragraph, and which is easily installable on an engine driving means because it is comprised of a continuous smooth surface. This is in contrast to a saw chain which tends to kink and which makes installation on a chain saw somewhat difficult.

It is a further object of the invention to provide a device, as described in the previous paragraphs, and which may be easily repaired with Thermite if the continuous strip breaks. A broken continuous strip can be repaired by placing a small plate over the broken ends and fusing it to the strip. The ends can also be butt welded.

It is a still further object of the invention to provide a device, as described in the preceding paragraphs, and which is very stable during cutting operation because the cutting elements are integral with the continuous strip. In contrast, in a saw chain, the teeth tend to move out with their individual links and twist in regard to the remainder of the saw chain. Another advantage derived from the teeth being integral with the strip is that rear-back and roughness are eliminated. When rear-back occurs in a saw chain, a cutting element and its link tend to move out away from the remainder of the chain. In the present invention, since there are no pivots, if there is any tendency for rear-back, the strip will tend to move with the cutters and substantially reduce the movement.

It is another object of the invention to provide, a device as described in the preceding paragraphs, and in which the allochirally arranged cutting elements on opposite sides of the cutting strip overlap each other only a small amount or not at all. Overlapping is eliminated or reduced to a minimum because the cutting elements are integral with the continuous strip. Saw chains are designed with the toes of router cutters overlapping considerably because the cutters tend to pull laterally outwardly away from the chain during cutting. Substantial overlapping of the cutters is undesirable because it restricts chip flow and slows the movement of the chain.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes:

FIG. 1 is a side elevational view of a powered driving member supporting a continuous cutting strip according to the invention;

FIG. 2 is an enlarged fragmentary view of a portion of the driving member and a portion of the cutting strip;

FIG. 3 is a fragmentary cross-sectional view taken substantially as indicated by the line 3—3 on FIG. 2;

FIG. 4 is a plan view of a portion of a continuous cutting strip after it has been stamped out of a single piece of metal and before it is formed and the cutting elements are sharpened for operation;

FIG. 5 is a plan view of a portion of a completed continuous cutting strip according to the invention;

FIG. 6 is an enlarged fragmentary view, similar to FIG. 2, illustrating another embodiment of a driving wheel and another embodiment of cutting elements according to the invention;

FIG. 7 is a fragmentary end view taken substantially as indicated by the line 7—7 on FIG. 6;

FIG. 8 is an end view of an L-shaped cutting element;

FIG. 9 is an end view of a block-type cutting element;

FIG. 10 is a fragmentary plan view of a continuous strip having block-type cutting elements, as shown in FIG. 9;

FIG. 11 is a fragmentary side elevational view of the embodiment of the invention shown in FIG. 10; and FIG. 12 illustrates a means of sharpening the cutting elements shown in FIGS. 9–11.

Referring again to the drawings, there is illustrated in FIG. 1 a gasoline engine and frame structure 10, as may be found in chain saws, and supported thereon are a driving wheel 11, a bar or blade 12, and a continuous cutting strip 13. The engine in the structure 10 is typically driven by gasoline and which causes rotation of a driving shaft 17 which in turn causes rotation of the strip driving wheel 11.

The wheel 11, as may be best seen in FIGS. 2 and 3, is shown to be made of a single piece of metal having a diameter of about 4 inches and having an axial thickness adjacent its central portion of about 0.380 of an inch. Adjacent the circumference, the thickness may be about 0.144 of an inch. Circumferentially spaced adjacent the circumference are axially directed pins 18, extending through the wheel so that a portion of each protrudes from each side of the wheel.

The bar 12 is adjustably secured to the structure 10 by means of bolts 19 extending through a slot 20, adjacent the inner end of the bar. The bar is positioned so as to be spaced from the wheel 11, the shape of the inner end of the bar being arced at 23 to conform to the wheel. The bar may be made of laminated pieces of metal or may be made of a single piece, having a thickness of about 0.144 of an inch so that it may be properly aligned and correspond in thickness to the outer portion of the wheel. Centrally in the bar is a lightening opening 24 and spaced outwardly therefrom in the transverse direction are longitudinally directed edges 25 and 26. The outer end or nose 29 of the bar is curved and has a radius of about 3 inches, having a circumferential edge 30 which joins the edges 25 and 26 tangentially. In the device shown, the distance between the extremities of the nose of the bar and the innermost portion of the wheel is about 22 inches.

The continuous cutting strip or band 13 can be made from a single piece of low carbon, SAE 1030–1050 steel that has been Austempered. It also can be made from SAE 1030–1050 steel that has been carburized to improve wear characteristics and Austempered to make it filable or made from SAE 1075–1095 steel that has been Austempered to toughen and make it filable.

As shown in FIG. 4, the band may be made by die stamping from a sheet of flexible steel having a thickness of 0.028 of an inch. The width of the flat band portion 31 is 0.150 of an inch. The stamped, but unformed strip, shown in FIG. 4, is made in its final form as indicated in FIGS. 1 to 3 and 5. From the position, shown in FIG. 4, the tangs 32 are bent inwardly or downwardly as shown in FIG. 2 from the outer band surface 33 so as to be in transverse alignment and parallel to each other and in axial alignment on the wheel 11. They fit loosely over the edges of the bar and the outer circumferential area of the wheel where they are in driven contact with the pins 18. Thus, rotation of the wheel in the clockwise direction drives the strip 13 so that it cuts in the direction of the arrows 35 and 36 in FIG. 1. The tangs, before being bent, have a length of about 0.237 of an inch.

The ends of the strip are secured together to make it continuous by a Thermite process, by electric fusion welding, or by brazing with a short overlap. The ends can also be secured together by butt welding.

Extending outwardly from the strip are longitudinally spaced cutting elements 37. They are equally and sequentially spaced, alternately on the opposite side of the band, as left and right-hand cutters, in allochiral relationship and they are formed from the stamped out parts, shown as 37a in FIG. 4.

The cutting elements extend outwardly from the band, vertically in FIGS. 2 and 3, a distance of about 0.150 of an inch and have a longitudinal length in the direction of the band, as shown in FIG. 2, of about 0.200 of an inch. As best seen in FIGS. 2, 3, and 5, the cutting elements have a side portion 38 and a transverse portion 39, formed on a continuous curve. The side portion extends laterally and generally vertically outwardly from the band and the transverse portion returns on the curve to extend over the band and spaced therefrom. The inner edge 40 on the transverse portion terminates at the center of the band portion 31 or at the longitudinal center plane thereof, or may overlap the latter approximately 0.005 of an inch. The radius of the continuous curve forming the side and transverse portions is about 0.60 of an inch and has its center slightly laterally outwardly of the center plane of the band.

At the forward ends of the cutting elements are continuous cutting edges, a side cutting edge 41 being formed on the side portion 38 and a transverse cutting edge 42 being formed on the transverse portion 39. The cutting edges are formed on an inwardly and rearwardly extending bevel formed by filing or grinding from the laterally outermost portion of the cutting elements, horizontally at an angle of about 30 degrees with the direction of the band portion 31. A cylindrical file 45, shown in FIG. 5, or a curved-edge flat file may be used to form and sharpen the continuous cutting edges. The transverse portion 39 extends rearwardly and inwardly or vertically downwardly from the transverse cutting edge 42 and the side portion 38 extends rearwardly and laterally inwardly from the side cutting edge 41 to provide clearances for the cutters as they pass through the wood kerf.

Extending vertically outwardly and spaced forwardly of the respective cutters on opposite side of the band are depth gauges 43 formed by bending the blank members 43a, in FIG. 4, upwardly. The depth gauges are spaced forwardly of their respective cutters about 0.25 of an inch and extend upwardly from the band surface 33 about 0.028 of an inch less than the height of the transverse cutting edges. The depth gauges are relieved at their forward upper surfaces 44 for easy movement along the kerf. Approximately centrally in the longitudinal direction between each two pairs of tangs 32 is a right- or left-hand cutter and its respective depth gauge. The distance between each two pairs of tangs is about 1.055 inches, the distance between the front edges of successive depth gauges being about the same. When low carbon steel is used, the outer surfaces of the cutting elements and the laterally outer surfaces of the tangs are carburized and Austempered. When the SAE 1075 or 1095 steel is used, the entire band is Austempered before the cutting edges are ground or filed.

In FIGS. 6 and 7, another form of drive wheel is shown. Here, the drive wheel 46 has circumferentially spaced recesses 47, axially aligned on opposite side of the wheel. The recesses 47, spaced to receive the tangs, have an axial depth of about 0.120 of an inch, and have a radial depth of about 0.600 of an inch. The distance along the inner circumferential edge or base is about 0.250 of an inch and the angle of the forward edge 49 is about 30 degrees with a perpendicular to and at the forward end of the base 48. The driving contact occurs along a curved projection 50, the contact with the tang being along any point on the curve, tangentially with the rear edge of the tang.

Rearwardly and radially inwardly of the convex curve 50 is a concave relieved portion 52 which provides a clearance for sawdust ejection, as does the angle at 49. The wheel 46 is of the same axial thickness and diameter as the wheel 11.

In FIGS. 6 and 7, the band structure is the same as that shown in FIGS. 1 through 5 except for the configuration of the allochirally arranged cutting elements. Here, the cutting elements 53 have a side portion 54 which curves laterally outwardly and vertically upwardly from the flat band surface 33 and which terminates at its upper end at a point 55, forming a substantial semicircle in end view, as shown in FIG. 7. Extending transversely inwardly from the point 55 is a flat transverse portion 57 extending over the band surface 33 and terminating inwardly about 0.005 to 0.010 of an inch beyond the longitudinal center plane of the band. The portions 54 and 57 have a continuous beveled surface 58 forming their front faces on which is formed a side cutting edge 59 and a transverse cutting edge 60, the cutting edges being continuous and joining at the point 55. These cutting edges may be filed or ground in the same manner as the cutting edges on the cutting elements 37. The transverse cutting edge, as shown in FIG. 7, is about 3 degrees above the horizontal or approximately 93 degrees with the direction of the depth gauge.

The outer surfaces of the portions 54 and 57 trail rearwardly and inwardly at an angle of about 3 degrees. The width of the cutter, measuring from the laterally outermost portion of the side portion 54 to the innermost edge of the transverse portion 57, is about 0.168 of an inch and the inside radius of the side portion 54 is about 0.055 of an inch, the center of the curve being approximately on the inner vertical line of the depth gauge, as shown in FIG. 7. The longitudinal length of the side portion 54 is about 0.20 of an inch and the height of the transverse cutting edge 60 at the laterally innermost portion is about 0.146 of an inch above the surface 33, the height of the depth gauge being about 0.025 of an inch lower. The transverse portion from its innermost edge 61 at the cutting edge 60 trails rearwardly toward the outer portion of the cutter at an angle of about 1 degree.

In FIG. 8, for use on the continuous strip, there is shown a generally L-shaped cutting element 63, with the depth gauge not shown. Extending outwardly from the flat surface 33 at an angle of approximately 15 degrees is a side portion 64 which terminates vertically outwardly in a transverse portion 65. On the front faces of the side and transverse portion 64 and 65, respectively, are beveled surfaces 66 and 69, forming one continuous bevel, and upon which a side cutting edge 70 joins a transverse cutting edge 71 to form one continuous cutting edge. These cutting edges can be formed with a cylindrical file or a flat file having a curved edge to form a continuous cutting edge at the corner 72, the bevel there being curved.

If a flat file is used to form the bevels and the cutting edges on the side and transverse portions, a true chisel-shaped cutting edge can be made and which may be joined by a rounded cutting edge at 72. Here, the transverse cutting edge 71 is substantially parallel to the surface 33 and the transverse portion 65 trails rearwardly inwardly at an angle of about 5 degrees and the side portion 64 trails rearwardly inwardly at an angle of about 3 degrees. The angle of the cutting edge 71 with the longitudinal direction of the band is about 30 degrees. The height of the cutting edge 71 above the surface 33 is about 0.160 of an inch and the longitudinal length of the side portion 64, extending rearwardly from the cutting edge 70, is about 0.200 of an inch. As may be seen in FIG. 8, the transverse portion 65 extends inwardly beyond the longitudinal center plane of the band and the width of the cutting element from the laterally most outwardly point to the laterally most inwardly point is about 0.140 of an inch.

In FIGS. 9–12, a block-type cutter is shown welded or brazed to the top surface 33 of the band. The width of the block across its face, as shown in FIG. 9, is approximately 0.164 of an inch, the portion extending to the right of the depth gauge being approximately 0.051 of an inch wide and the portion of the block extending inwardly to the left beyond the longitudinal center plane of the band being approximately 0.01 of an inch wide. Extending upwardly from a flat under surface 75 is a vertically directed front face 76, having an outside edge 77, an upper transverse edge 78, and an inner side edge 80. Extending rearwardly from the edge 77 is side face 81, trailing rearwardly and laterally inwardly at an angle of about 3 degrees. Extending rearwardly from the upper transverse edge 78 is a top surface 82 which is in the form of an arc trailing inwardly toward the band. This arc is provided so that the top cutting edge, to be described, may be sharpened during the cutting operation by a whetting member on an engine structure, such as 10. The top surface 82 joins the side face 81 and also joins an inside face 83 which trails rearwardly and laterally outwardly from the inner edge 80 at an angle of about 3 degrees. The length of the cutter from the edges 77 and 78 to the rearward face 86 is approximately 0.240 of an inch.

A side cutting edge 87 is formed at the upper portion of the edge 77 and a transverse cutting edge is formed coincident with the edge 78. The cutting edges are formed and sharpened with a cylindrical file 88, as shown in FIGS. 10 and 12, the file having a diameter of about 0.18 of an inch. In sharpening the side and top cutting edges, the file is moved from the outside edge as at 87, across a concave face 89, formed on the front face of the cutter, at an angle of about 30 degrees with the direction of the band and inwardly downwardly so to form an arc at the edge 80 that is greater than the arc formed at the edge 87. This direction of filing with a cylindrical file also causes the cutting edge 78 to be hollow ground, as particularly indicated in FIG. 12. The angle of the file downwardly is approximately 10 degrees from the horizontal. It should be noted that the transverse cutting edge is approximately at an angle of 3 degrees below the horizontal and this is caused by the fact that the top surface 82 is arced, the inned end of the transverse cutting edge being on a lower point of the arc than the outer end thereof, as may be seen in FIGS. 10 and 11. The length of the block longitudinally along the under surface 75 is approximately 0.200 of an inch.

From the foregoing, it should be noted that the continuous cutting strip, according to the invention, with the various available cutting elements described is a far more economical wood-cutting device than is a saw chain of comparable size and cutting ability. Further, while it is apparent that the various cutting elements described in the foregoing can be sharpened, when dulled, the entire strip may be thrown away without a substantial economic loss so as to avoid the chore of sharpening, and a new one may be fitted onto the engine and frame structure 10. The continuous cutting strip disclosed can be used for all types of cutting for which a saw chain having comparable size cutting teeth can be used.

The invention and its attendant advantages will be understood from the foregoing description and it will be apparent that various changes may be made in the form, construction and arrangement of the parts of the invention without departing from the sprit and scope thereof or sacrificing its material advantages, the arrangement hereinbefore described being merely by way of example. I do not wish to be restricted to the specific forms shown or uses mentioned except as defined in the accompanying claims, wherein various portions have been separated for clarity of reading and not for emphasis.

I claim:

1. A power driven continuous cutting strip comprising:
   (a) a continuous band for engagement with a driving and supporting means;
   (b) longitudinally spaced cutting elements extending outwardly from said band alternately on opposite sides thereof in allochiral relationship;
   (c) depth gauges extending outwardly from said band, each cutting element having a depth gauge spaced forwardly thereof in the direction of cutting; and
   (d) tangs extending inwardly from said band for engagement with said driving means.

2. A power driven continuous cutting strip comprising:
   (a) a continuous band for engagement with a driving and supporting means;
   (b) longitudinally spaced cutting elements extending outwardly from said band alternately on opposite sides thereof in allochiral relationship;
   (c) each of said cutting elements having a side cutting edge extending laterally outwardly from said band and having a returning transverse cutting edge extending over said band;
   (d) said cutting edges being continuous;
   (e) depth gauges extending outwardly from said band, each cutting element having a depth gauge spaced forwardly thereof in the direction of cutting; and
   (f) tangs extending inwardly from said band for engagement with said driving means.

3. A power driven continuous cutting strip comprising:
   (a) a continuous band for engagement with a driving and supporting means;
   (b) longitudinally spaced cutting elements extending outwardly from said band alternately on opposite sides thereof in allochiral relationship;
   (c) each of said cutting elements having a side cutting edge extending laterally outwardly from said band and having a returning transverse cutting edge extending over said band,
   (d) said cutting edges being continuous;
   (e) depth gauges extending outwardly from said band, each cutting element having a depth gauge spaced forwardly thereof in the direction of cutting; and (f) tangs extending inwardly from said band for engagement with said driving means, (g) said band, cutting elements, depth gauges, and tangs being integral.

4. A power driven continuous cutting strip comprising:
   (a) a continuous band for engagement with a driving and supporting means;
   (b) longitudinally spaced cutting elements extending outwardly from said band alternately on opposite sides thereof in allochiral relationship;
   (c) each of said cutting elements having a side cutting edge extending laterally outwardly from said band and having a returning transverse cutting edge extending over said band,
   (d) said cutting edges being continuous;
   (e) depth gauges extending outwardly from said band, each cutting element having a depth gauge spaced forwardly thereof in the direction of cutting; and
   (f) tangs extending inwardly from said band for engagement with said driving means,
   (g) said band, cutting elements, depth gauges, and tangs being of one piece of material and of the same cross-sectional thickness.

5. A power driven continuous cutting strip comprising:
   (a) a continuous band for engagement with a driving and supporting means;
   (b) longitudinally spaced cutting elements extending outwardly from said band alternately on opposite sides thereof in allochiral relationship;
   (c) each of said cutting elements having a side cutting edge extending laterally outwardly from said band and having a returning transverse cutting edge extending over said band,
   (d) said side cutting edge and said transverse cutting edge being on a continuous curve,
   (e) said transverse cutting edge terminating laterally inwardly at the longitudinal center line of said band;
   (f) depth gauges extending outwardly from said band, each cutting element having a depth gauge spaced forwardly thereof in the direction of cutting; and
   (g) longitudinally spaced pairs of tangs on said band, each tang of each pair extending inwardly from opposite edges of said band and each being in transverse alignment with the other of a pair for engagement with said driving means.

6. The invention according to claim 5 in which there are one cutting element and its depth gauge longitudinally spaced between each two pairs of tangs.

7. The invention according to claim 5 in which said cutting edges are beveled and in which said transverse cutting edge is at an angle of approximately 30 degrees with the direction of the band.

8. A power driven continuous cutting strip comprising:
   (a) a continuous band for engagement with a driving and supporting means;
   (b) longitudinally spaced cutting elements extending outwardly from said band alternately on opposite sides thereof in allochiral relationship;
   (c) each of said cutting elements having a curved side portion extending laterally outwardly from said band, said curved portion having a concave face facing in a direction over and substantially parallel to said band,
   (d) said curved portion terminating in a substantially flat transverse portion extending over and spaced from said band,
   (e) said curved portion and said transverse portion having a continuous beveled cutting edge;
   (f) depth gauges extending outwardly from said band, each cutting element having a depth gauge spaced forwardly thereof in the direction of cutting; and
   (g) tangs extending inwardly from said band for engagement with said driving means.

9. A power driven continuous cutting strip comprising:
   (a) a continuous band for engagement with a driving and supporting means;
   (b) longitudinally spaced cutting elements extending outwardly from said band alternately on opposite sides thereof in allochiral relationship;
   (c) each of said cutting elements having a substantially flat side portion extending laterally outwardly and upwardly from said band,
   (d) said side portion terminating in a substantially flat transverse portion extending inwardly over and substantially parallel to said band,
   (e) said side portion and said transverse portion having a continuous beveled cutting edge,
   (f) said cutting edge on said transverse portion extending inwardly to at least the longitudinal center plane of said band;
   (g) depth gauges extending outwardly from said band, each cutting element having a depth gauge spaced forwardly thereof in the direction of cutting; and
   (h) tangs extending inwardly from said band for engagement with said driving means.

10. A power driven continuous cutting strip comprising:
    (a) a continuous band for engagement with a driving and supporting means;
    (b) longitudinally spaced cutting elements extending outwardly from said band alternately on opposite sides thereof in allochiral relationship,
    (c) each of said cutting elements being a block fixed at an under portion thereof to the outer surface of said band;
    (d) a portion of each block extending laterally outwardly beyond the outer surface of said band, each block extending laterally inwardly to at least the longitudinal center plane of said band;
    (e) each block having a front face extending upwardly from said under surface;
    (f) a top surface on each block extending rearwardly from said front face and trailing inwardly toward said band;
    (g) an outside face on each block between said top surface and said under surface and extending rearwardly and laterally inwardly from said front face;
    (h) an inside face on each block extending between said top surface and said under surface;
    (i) a side cutting edge formed with said front face and said outside face and a top cutting edge formed with said front face and said top surface, said cutting edges forming one continuous cutting edge;
    (j) depth gauges extending outwardly from said band, each cutting element having a depth gauge spaced forwardly thereof in the direction of cutting; and
    (k) tangs extending inwardly from said band for engagement with said driving means.

11. A power driven continuous cutting strip comprising:
    (a) a continuous band for engagement with a driving and supporting means;
    (b) longitudinally spaced cutting elements extending outwardly from said band alternately on opposite sides thereof in allochiral relationship,
    (c) each of said cutting elements being a block fixed at an under portion thereof to the outer surface of said band;
    (d) a portion of each block extending laterally outwardly beyond the outer surface of said band, each block extending laterally inwardly to at least the longitudinal center plane of said band;
    (e) each block having a front face extending upwardly from said under surface;
    (f) a top surface on each block extending rearwardly from said front face and trailing inwardly toward said band;
    (g) an outside face on each block between said top surface and said under surface and extending rearwardly and laterally inwardly from said front face;
(h) an inside face on each block extending between said top surface and said under surface,
(i) a side cutting edge formed with said front face and said outside face and a top cutting edge formed with said front face and said top surface, said cutting edges forming one continuous cutting edge;
(j) said top cutting edge trailing rearwardly from said side cutting edge,
(k) said front face being concave so that said transverse cutting edge is hollow ground, the arc of said concavity at said side cutting edge being smaller than the arc at said inside face and said front face;
(l) depth gauges extending outwardly from said band, each cutting element having a depth gauge spaced forwardly thereof in the direction of cutting; and
(m) tangs extending inwardly from said band for engagement with said driving means.

12. A power driven continuous cutting strip comprising:
(a) a continuous band for engagement with a driving and supporting means;
(b) longitudinally spaced cutting elements extending outwardly from said band alternately on opposite sides thereof in allochiral relationship,
(c) each of said cutting elements being a block fixed at an under portion thereof to the outer surface of said band;
(d) a portion of each block extending laterally outwardly beyond the outer surface of said band, each block extending laterally inwardly to at least the longitudinal center plane of said band;
(e) each block having a front face extending upwardly from said under surface;
(f) a top surface on each block extending rearwardly from said front face and trailing inwardly toward said band;
(g) an outside face on each block between said top surface and said under surface and extending rearwardly and laterally inwardly from said front face; and
(h) an inside face on each block extending between said top surface and said under surface,
(i) a side cutting edge formed with said front face and said outside face and a top cutting edge formed with said front face and said top surface, said cutting edges forming one continuous cutting edge,
(j) said top cutting edge trailing rearwardly from said side cutting edge,
(k) said front face being concave so that said transverse cutting edge is hollow ground, the arc of said concavity at said side cutting edge being smaller than the arc at said inside face and said front face,
(l) said top surface being on an arc to permit sharpening of said top cutting edge with a whetting member while cutting.

13. In a portable power driven saw:
(a) a power source member;
(b) a driving wheel supported and driven by said power member;
(c) a flat bar extending from said member and being in longitudinal alignment with said wheel,
(d) said bar having an inner end closely spaced from said wheel and having an outer end remote from said wheel;
(e) transversely spaced edges on said bar extending longitudinally from said wheel and being in longitudinal alignment therewith,
(f) said outer end being curved and having an edge extending between and joining said transversely spaced edges;
(g) a continuous band fitted on said bar edges for travel thereon and fitted on a peripheral portion of said wheel to be driven thereby;
(h) means on said wheel engaging means on said band whereby rotation of said wheel drives said band; and
(i) cutting elements extending outwardly from said band,
(j) said band, said cutting elements, and said means on said band engaged with said wheel being integral.

14. In a portable power driven saw:
(a) a power source member;
(b) a driving wheel supported and driven by said power member;
(c) a flat bar extending from said member and being in longitudinal alignment with said wheel,
(d) said bar having an inner end closely spaced from said wheel and having an outer end remote from said wheel;
(e) transversely spaced edges on said bar extending longitudinally from said wheel and being in longitudinal alignment therewith,
(f) said outer end being curved and having an edge extending between and joining said transversely spaced edges;
(g) a continuous band fitted on said bar edges for travel thereon and fitted on a peripheral portion of said wheel to be driven thereby;
(h) means on said wheel engaging means on said band whereby rotation of said wheel drives said band; and
(i) cutting elements extending outwardly from said band,
(j) said band, said cutting elements, and said means on said band engaged with said wheel being integral and of one piece of metal.

15. In a portable power driven saw:
(a) a power source member;
(b) a driving wheel supported and driven by said power member;
(c) a flat bar extending from said member and being in longitudinal alignment with said wheel;
(d) said bar having an inner end closely spaced from said wheel and having an outer end remote from said wheel;
(e) transversely spaced edges on said bar extending longitudinally from said wheel and being in longitudinal alignment therewith,
(f) said outer end being curved and having an edge extending between and joining said transversely spaced edges;
(g) a continuous band fitted on said bar edges for travel thereon and fitted on a peripheral portion of said wheel to be driven thereby;
(h) longitudinally spaced pairs of tangs on said band, each tang of each pair extending inwardly from opposite edges of said band and each tang being in alignment with the other of a pair so that each pair straddles the bar and a portion of said wheel;
(i) axially directed pins extending through said wheel adjacent the periphery thereof engaging at least one pair of said tangs in driving engagement; and
(j) cutting elements extending outwardly from said band.

16. In a portable power driven saw:
(a) a power source member;
(b) a driving wheel supported and driven by said power member;
(c) a flat bar extending from said member and being in longitudinal alignment with said wheel,
(d) said bar having an inner end closely spaced from said wheel and having an outer end remote from said wheel;
(e) transversely spaced edges on said bar extending longitudinally from said wheel and being in longitudinal alignment therewith,
(f) said outer end being curved and having an edge extending between and joining said transversely spaced edges;
(g) a continuous band fitted on said bar edges for travel thereon and fitted on a peripheral portion of said wheel to be driven thereby;
(h) longitudinally spaced pairs of tangs on said band, each tang of each pair extending inwardly from opposite edges of said band and each tang being in alignment with the other of a pair so that each pair straddles the bar and a portion of said wheel;
(i) circumferentially spaced recesses on opposite sides of said wheel, each recess on one side of said wheel being in axial alignment with a recess on the other side thereof,
(j) said pairs of recesses being spaced and shaped to receive said pairs of tangs by which rotation of said wheel drives said band; and
(k) cutting elements extending outwardly from said band,
(l) said band, said cutting elements, and said tangs being integral.

17. In a portable power driven saw:
(a) a power source member;
(b) a driving wheel supported and driven by said power member;
(c) a flat bar extending from said member and being in longitudinal alignment with said wheel,
(d) said bar having an inner end closely spaced from said wheel and having an outer end remote from said wheel,
(e) transversely spaced edges on said bar extending longitudinally from said wheel and being in longitudinal alignment therewith,
(f) said outer end being curved and having an edge extending between and joining said transversely spaced edges;
(g) a continuous band fitted on said bar edges for travel thereon and fitted on a peripheral portion of said wheel to be driven thereby;
(h) means on said wheel engaging means on said band whereby rotation of said wheel drives said band;
(i) longitudinally spaced cutting elements extending outwardly from said band alternately on opposite sides thereof in allochiral relationship;
(j) each of said cutting elements having a side cutting edge extending laterally outwardly from said band and having a returning cutting edge extending over said band,
(k) said cutting edges being continuous; and
(l) depth gauges extending outwardly from said band, each cutting element having a depth gauge spaced forwardly thereof in the direction of cutting;
(m) said band, said cutting elements, said means on said band engaged with said wheel, and said depth gauges being integral and of the same piece of metal.

References Cited

UNITED STATES PATENTS

| | | | |
|---|---|---|---|
| 1,916,903 | 7/1933 | Wine | 143—133 |
| 2,380,753 | 7/1945 | Segerstad | 143—135 |

FOREIGN PATENTS

| | | |
|---|---|---|
| 396,208 | 1/1909 | France. |
| 856,276 | 12/1960 | Great Britain. |

DONALD R. SCHRAN, *Primary Examiner.*